S. H. HOGGSON.
MOTOMETER.
APPLICATION FILED NOV. 1, 1911.

1,133,646.

Patented Mar. 30, 1915.
3 SHEETS—SHEET 1.

WITNESSES

INVENTOR

ATTORNEY

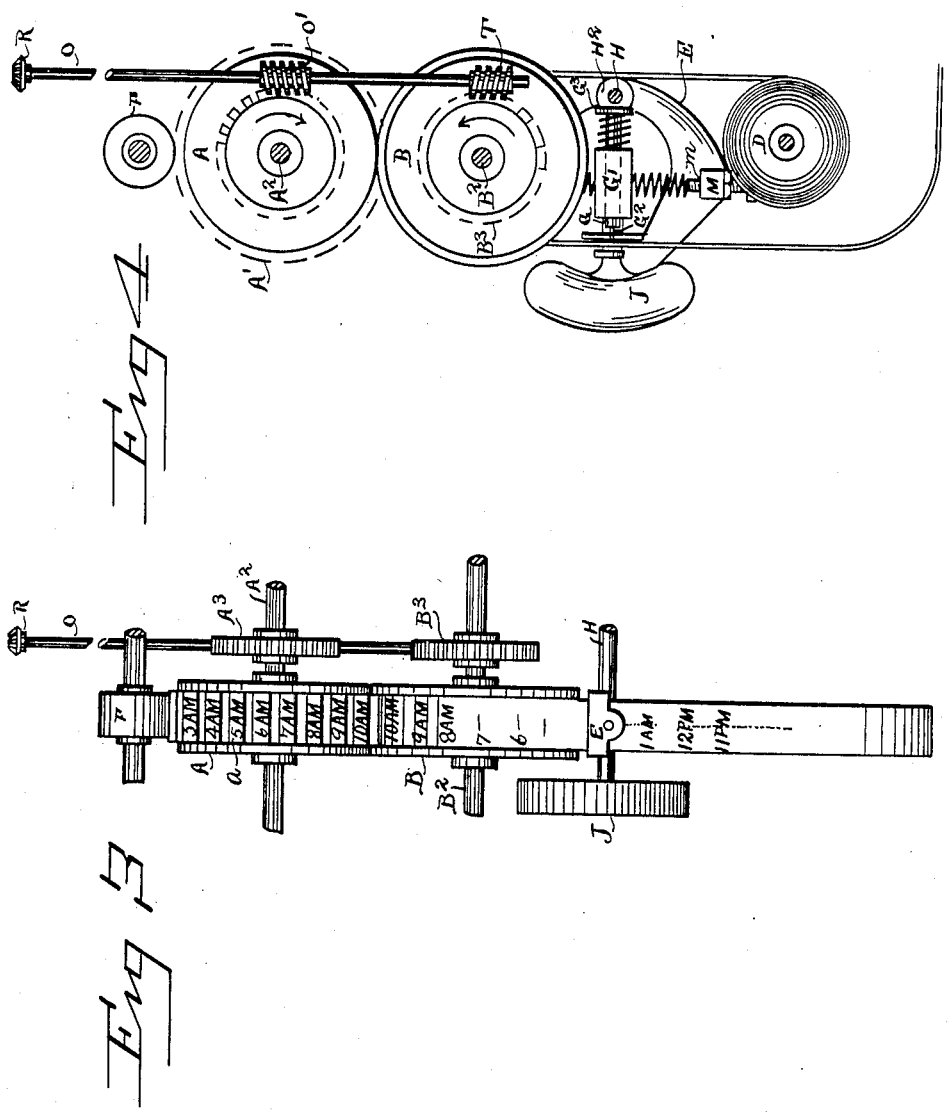

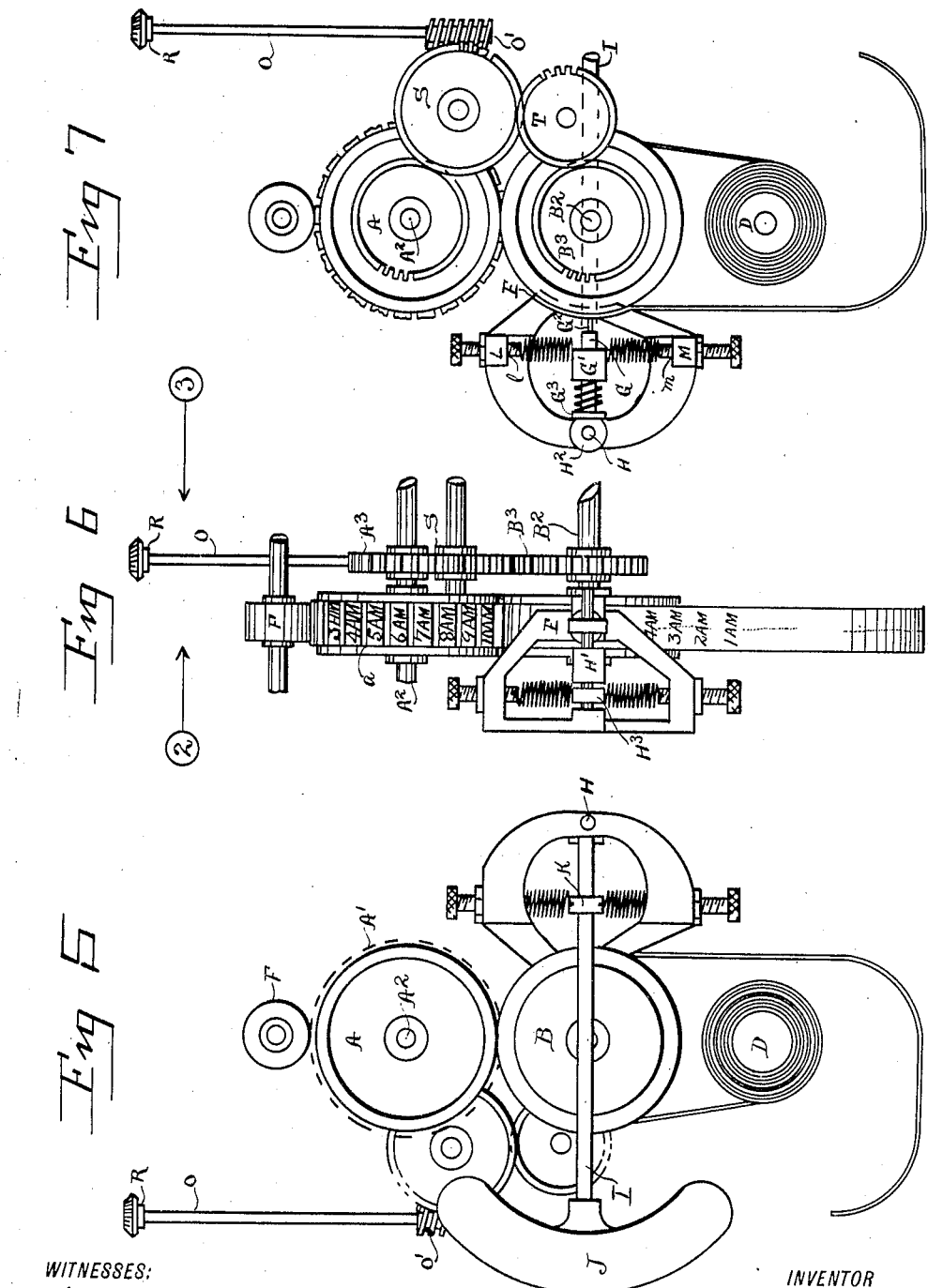

UNITED STATES PATENT OFFICE.

SAMUEL H. HOGGSON, OF ARLINGTON, NEW JERSEY.

MOTOMETER.

1,133,646. Specification of Letters Patent. Patented Mar. 30, 1915.

Application filed November 1, 1911. Serial No. 657,928.

*To all whom it may concern:*

Be it known that I, SAMUEL HAMILTON HOGGSON, a citizen of the United States, and resident of the town of Arlington, county of Hudson, State of New Jersey, have invented certain new and useful Improvements in Motometers, of which the following is a specification.

This instrument, which is the result of my experiment and invention, is for the purpose of registering and recording the movement due to the vibration, sway or continued undulation of a body, or any part thereof to which it is attached.

In construction the device is particularly simple though arranged for the highest possible efficiency, and its indicating portions are so arranged and adjusted as to make the whole extremely sensitive, thus it will be effective even where the shock is slight.

My instrument in the proper performance of its duties depends upon two forces, one of which I will call the positive or principal force is a known quantity and quality and is as near constant as it is possible to make it. This force is used to impart to the several cylinders or drums, and to the other mechanically moving parts, their proper relative motion. The other force is the one which my instrument is designed to record. It is the sharp jar or vibration due to the motion of the body to which it is attached, or it may be simply the motion of one of the parts of the greater body, occurring at intervals of long or short duration, they will leave their impression permanently recorded on a roll of tape provided for that purpose.

The apparatus can be used for a number of different purposes, the main drums or wheels may turn at different speeds and the printing wheel may inscribe any series of characters on the tape, but I have used it very successfully in conjunction with an ordinary time piece, such as an eight day clock for its positive driving means and I will so describe it. In this instance the type wheel prints the hour of the day and night and makes one complete revolution every twenty four hours. and the platen is so arranged that it will turn in unison with the type wheel. I have invented new and simple means of securing the recording needle in its proper relative position, and have invented new and highly efficient means of imparting motion to the needle. Many other novel features I have added which will be fully described in the specification which follows:—

The following is what I consider the best means of carrying out this invention.

Figure 2:
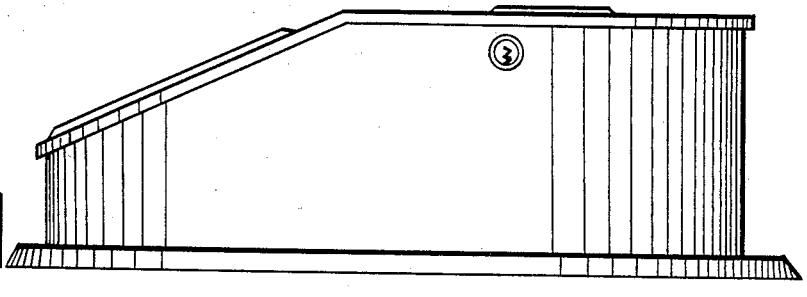
Figure 1:
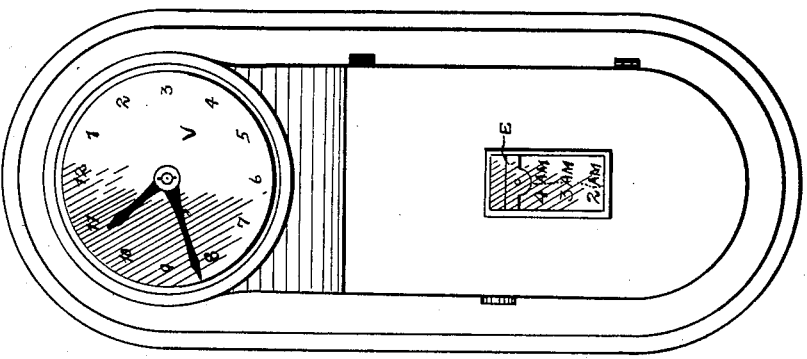

The accompanying drawings form a part of this specification, in which:

Figure, 1 is a front elevation. Fig., 2 is a side elevation corresponding to Fig. 1. Fig., 3 is a side elevation of the interior mechanism. Fig., 4 shows the interior mechanism in front elevation. Fig., 5 shows in side elevation a device of a somewhat different construction having the same general principle. Fig., 6 is a front elevation of the device shown in Fig. 5. Fig., 7 is an elevation of the side opposite to that shown in Fig. 5.

Similar letters of reference indicate like parts in all the figures where they appear.

One of the principal members of my mechanism is the printing wheel or drum shown at A. It is of cast metal preferably brass and at its periphery is provided with a deep circumferential groove $a$. Into the groove $a$, a rubber band $A^1$ is secured carrying a series of projections, upon the faces of which have been produced printing characters representing the twenty four hours of the day. The wheel A carrying its band $A^1$ is firmly secured upon a shaft $A^2$, and conveniently and securely located upon this shaft is a cut-gear $A^3$.

At a point below the wheel A, a revolving wheel or drum is located. This drum B is also provided with a circumferential groove about its periphery indicated by $b$. The location of the drum or wheel B is such that the type members carried on the wheel A, will bear with sufficient force upon the uppermost face of the groove $b$, and leave an impression of the character carried by the adjacent type face upon a ribbon, or tape of paper or other material which is passing over the wheel B. The tape is supplied from a roll D convenient in size to furnish any desired amount. I have in my experiment used a roll of about two inches in diameter, and have found this length to be sufficient to receive the printed characters continuously for six months allowing sufficient for waste during adjustments or resettings. The tape roll D is located in any convenient place relative to the wheel B and is loosely and rotatably mounted upon an axis $D^1$. After the paper has passed over the wheel B and has received the impression, it passes beneath the shield E through which the perforating needle G operates, then the paper is free to fall downward curling up in any convenient place which may present itself.

That the printing type carried by the type wheel A may print successively and continuously, it is necessary that a small quantity of ink be supplied to the outer or operative faces of the type. I accomplish this by locating conveniently above the type wheel a disk F of soft material as felt, in such a manner that it will bear with an even continuous pressure upon the operative faces of the type. This disk F has been prepared by having its periphery well saturated with a special ink such as is used on the ordinary stamp pad. One of the most important members of my device is the needle G and the means for properly operating it.

Referring to Figs. 3 and 4, the needle G is shown as mounted in a holder $G^1$, with convenience for a horizontal axial movement therein. It is of steel of a convenient size rounded and well polished and the point $G^2$ is made small and sharp. The end of the needle opposite the point, carries a large head or button $G^3$, which may be formed integral therewith or which may be a separate piece securely fastened in place. A shaft H mounted in the bearing $H^1$ is free to revolve therein, it carries at one end the part $H^2$, which is a nearly complete disk, but a small section has been cut away so as to produce a flat face to bear fairly upon the button head $G^3$ of the needle G. Securely attached to the shaft H, to the end opposite to that which carries the part $H^2$ is a block $H^3$ having a transverse hole. The rod I, which I will sometimes term the vibrating arm carries the hammer J at an extreme end, the other end is inserted in the hole and fastened therein by the binding screw. On the rod I, a short distance from its junction with the block $H^3$, a block K is fixed. Two blocks L and M in line with each other, and with the block K are located at equal distances from the rod I, one on each side thereof. Screw-threaded holes $l$ and $m$ have been produced one in each of the blocks L and M respectively, and a knurled-headed adjusting screw is inserted into each of the screw-threaded holes. Light coiled springs are stretched from these adjusting screws to the blocks K and exert an approximately even tension on each side insuring, that the rod I, will tend to remain in a horizontal position. On the lower end of the upright shaft O is a worm-gear $O^1$ meshing with the gear $A^3$, and a second worm-gear T meshes with the cut-gear $B^3$, on the shaft $B^2$. On the upper end of the upright shaft O is a bevel-gear R.

The operation of my device and its separate parts is simple and of an obvious character, and yet I will describe it in detail as certain elements may develop which have not been fully described in the specification. A source of positive and continuous power as the clock V is attached to the bevel-gear R driving it with a motion that will cause it to make one complete revolution each hour. The motion is transmitted through the worm-gears $O^1$ and T, which in turn mesh with the gears $A^3$ and $B^3$ causing the shafts and drums mounted thereon, to make a complete revolution in twenty four hours. The gear $A^3$ mounted on the shaft $A^2$ is of a corresponding size to the gear $B^3$, and has an equal number of teeth therewith. Meshing as it does with the gear T, it will make, and cause the shaft and printing drum adjacent to make a revolution corresponding to, and in even time with a revolution of the wheel or drum B. The friction of the type rolling against the adjacent surface of the drum B will cause the strip of paper between them to advance just so rapidly as required to present fresh surface at even distance apart, for the reception of the characters from the printing faces of the type. After the paper has received the impression it passes down behind the shield E and, if the body is at rest to which my instrument is attached, the paper falls into a coil below without further disturbance. But if the machine is moved even to a small extent the hammer J moves with an up and down motion turning the shaft H through a portion of a revolution, and the disk $H^2$ mounted thereon acting through its flattened side, imparts a horizontal motion to the needle G causing it to advance sufficiently to make a perforation, or if the motion be continuous, a series of perforations in the paper tape. With the result that an observation of the tape will reveal the time of day or night which the body was moved and for how long the movement continued. My mechanism is so arranged that the needle will make its record whether the hammer passes upward or downward, past its horizontal center.

Modifications may be made within the scope of the appended claims without departing from the principle or sacrificing the advantages of this invention. An ink pen of any approved style may be substituted for the pin G, or ink may be fed to the pin G, causing it to ink the edge of the perforation. A carbon or other prepared tape may pass in, parallel with the paper strip and between it and the type faces if this is desired metal type would be preferable to the rubber shown. I can provide a drum for rewinding the tape after it has received the impression and perforations, but I do not consider this necessary. Other modifications may be made by a good mechanic in the driving means, bevel-gears etc.

Having carefully and fully described my invention what I claim and desire to secure by Letters Patent is:—

1. In a mechanism for recording vibration, a platen and means for revolving it, a printing drum and means for revolving it and for passing a tape between the printing drum and the platen, and a horizontally extending spring balanced arm for recording successive vibrations on the tape after it has been printed.

2. In a mechanism for recording vibrations, a platen and means for revolving it, a printing drum and means for revolving it, means for passing a tape between the printing drum and the platen, means as a horizontal balanced vibrating lever for receiving each vibration and a needle operated by said lever for recording each vibration of said lever upon said tape.

3. The combination with a clock of a recording device having means for printing and sub-dividing a record slip to correspond to the indication on said clock and a perforating device operated by vibrations for impressing a variable record upon said slip.

4. In a mechanism for recording vibrations having in combination a clock, a normally horizontally disposed lever adapted to be vibrated out of the horizontal, a shaft partly rotated by said lever, a needle operated by said shaft and said lever for recording the said vibrations upon a tape, and platens and rollers arranged for presenting said tape to said needle.

5. In a mechanism for recording vibrations a horizontally and flexibly balanced vibrating member, and a shaft supporting said member and rotated thereby a nearly circular disk upon said shaft, and a spring retrieved horizontal needle arranged for reciprocating motions and operated by said disk, means for presenting a tape to said needle, and means for automatically inscribing a series of characters upon said tape before it is presented to said needle.

Signed at New York city in the county of New York and State of New York this 24th day of October 1911 in the presence of two witnesses.

S. H. HOGGSON.

Witnesses:
 ARTHUR PHELPS MARR,
 G. E. STERRITTE.